T. W. Detray,
Tool-Handle Ferrule,
№ 28,458. Patented May 29, 1860.
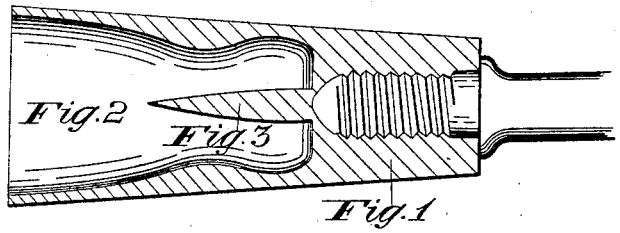
Witnesses:
Oramel H. Smith
Charles Lyman
Inventor:
Truman W. Detray

UNITED STATES PATENT OFFICE.

TRUMAN W. DETRAY, OF MONTPELIER, VERMONT.

IMPROVEMENT IN FERRULES.

Specification forming part of Letters Patent No. 28,458, dated May 29, 1860.

*To all whom it may concern:*

Be it known that I, TRUMAN W. DETRAY, of Montpelier, in the county of Washington and State of Vermont, have invented a new and Improved Mode of Constructing Ferrules for Hoes, Pitchforks, and other Implements; and I do hereby declare that the following is a full and exact description thereof and of the manner of attaching the handles to such implements, reference being had to the accompanying drawings, and to the figures of reference marked thereon.

To enable others skilled in the art to make and use my invention, I will proceed to describe its construction and operation.

The drawings represent a longitudinal section of my ferrule of about the largest size and shows the shape of the inside of the socket thereof, the shape of that part of the handle covered by the ferrule, and the mode of fastening the different parts of the implement together.

I make my ferrule from about two and a half inches to four inches in length, represented by that part of the drawings marked Figure 1, and that part of the handle covered by the ferrule is represented by that part of the drawings marked Fig. 2.

The socket of my ferrule, represented by the drawings, I make from about one and a quarter to two and a quarter inches in depth, and the concave surface thereof is near the bottom of the socket to be filled by the convex part of the handle by means of the wedge driven into the end of the handle, represented by Fig. 3 in the drawings. The convex part of the socket is about one inch from the bottom of the socket and serves to prevent the ferrule from becoming loose or coming off.

The lower or small part of my ferrule I make about one inch to one inch and a quarter in length below the bottom of the socket. In the end of this is a hole into which the shank of the hoe or other implement is inserted, being made in the form of a screw about one inch in length with a corresponding screw in the above-mentioned hole. I make my ferrule of malleable iron or of a composition of metal cast in the required form.

What I claim as my invention, and desire to secure by Letters Patent, is—

The ferrule herein described, when closed at one end and having an interior swell or projection, combined with a wedge projecting inwardly from the closed end, in the manner and for the purpose set forth.

TRUMAN W. DETRAY.

Witnesses:
ORAMEL H. SMITH,
CHARLES LYMAN.